Patented Mar. 19, 1935

1,994,946

UNITED STATES PATENT OFFICE 1,994,946

COMPOSITION FOR PHONOGRAPH RECORDS

Jacob Dolid, Bridgeport, Conn., assignor to Dictaphone Corporation, New York, N. Y., a corporation of New York No Drawing. Application May 20, 1930, Serial No. 454,190

8 Claims. (Cl. 106—1.5)

This invention relates to the preparation of wax compositions used in the manufacture of discs and cylinders for recording sound and especially to the preparation of wax compositions based on their syntheses from a fatty acid.

One of the objects thereof is to provide a simple and practical process for the preparation of such compositions. A further object is to provide a composition of the nature described which will be free from certain defects common to wax compositions usually employed in the manufacture of sound recording records. A further object is to provide a record blank which will be of uniform texture throughout its entire mass.

Other objects will be in part obvious and in part pointed out hereinafter.

This invention accordingly consists in the several steps and relation and order of each of the same to one or more of the others, all as will be described herein, and the scope of the application of which will be indicated in the following claims.

Heretofore such wax compositions have been synthesized from stearic acid by saponifying the acid with solutions of alkali containing dissolved aluminum or with the dry powdered oxides of lead; and adding to the metallic soaps thus formed materials of a waxy nature such as ceresin, Montan wax, carnauba wax, etc. The admixture of these latter materials was made in part to modify and adjust such properties as hardness, toughness, brilliancy, smoothness, etc., of the finished article; but the addition of such materials has been made principally in the attempt to reduce the tendency of the wax to crystallize, in spots, during or after solidification.

It is a well known fact that in the art of molding discs or cylinders from wax compositions synthesized from stearic acid, it is difficult to eliminate this tendency to crystallize; and at times as high a proportion as 20% of the finished articles have had to be rejected because they developed crystalline spots. The tracing of sound lines or grooves upon a wax record is performed with very delicate mechanism, so that unless uniformity of density and hardness obtain throughout the entire extent of the record blank, recording results will be uncertain and unsatisfactory and when crystallization occurs, the record blank must be scrapped. This fact results in adding greatly to the cost of manufacture of such devices.

Many attempts have been made to overcome this unsatisfactory condition of manufacture but without any marked degree of success. I have found, however, that satisfactory results may be attained, and record blanks produced which will be free from crystalline spots, by the employment of the processes now to be described.

I have found it possible to produce metallic soap compositions, which will not crystallize upon solidification by the employment of lauric acid as the fatty acid constituent of the compound. From such a compound record blanks may be made without the addition of paraffins or waxes to serve as solvents to reduce or prevent crystallization. However, such waxy materials may be added in order to obtain other valuable properties, which may enhance the general desirability and practical value of records so produced. The manner in which I prepare my new wax composition may be illustrated by the following examples:

1. To 100 pounds of melted lauric acid add 32 pounds of a 25% solution of sodium aluminate, and keep in molten condition until the chemical reaction is completed and the water has been driven off. The resulting compound may then be poured into suitable molds to solidify in the form of record blank desired.

2. To 100 pounds of molten lauric acid add gradually 28 pounds of litharge and upon completion of the chemical reaction, add slowly 18 pounds of a 25% solution of sodium aluminate keeping the mixture molten until the final reaction is completed and the water has been driven off. The resulting composition may then be molded as before.

These examples are given to illustrate the manner in which metallic soap combinations may be prepared from lauric acid. While the wax compositions prepared from the above formulæ are suitable for the manufacture of discs and cylinders for recording purposes, I do not wish to be construed as limiting myself to these specific formulæ. In fact, for certain types of recording, I find it desirable to vary the proportions and employ different metallic bases, such as alkali metals, alkaline earths or heavy metals; also, in order to obtain desirable characteristics I have found it advantageous to add to such metallic soap combinations described above, materials such as paraffin, carnauba wax, other metallic soaps, etc.

It will be seen from the foregoing that my invention is one well adapted to produce a waxlike composition having many desirable characteristics; and free from the defects found in other compositions frequently used in the manufacture of sound record tablets; and that further by my process I am able to produce tablets which will be free from spots of crystallized material, such tablets representing a marked advance in the art of sound recording and reproduction.

Having now described my process of making wax compositions and having made discs and cylinders of such compositions, what I claim as new and desire to secure by Letters Patent, is as follows:

1. An improved composition for sound records, comprising as a base a metallic soap of lauric acid and a waxy substance in solution in said metallic soap.

2. A sound record composition containing as a base a metallic soap of lauric acid having in solution a small amount of a waxy substance.

3. A sound record composition containing the reaction product of about 100 parts of melted lauric acid and about 32 parts of a 25% solution of sodium aluminate, the reaction product having been substantially dried.

4. A sound record composition containing the reaction product of approximately 100 parts of molten lauric acid, approximately 28 parts of lead monoxide, and approximately 18 parts of a 25% solution of sodium aluminate, the reaction product being dried.

5. A sound record composition containing the reaction product of about 100 parts of melted lauric acid and about 32 parts of a 25% solution of sodium aluminate, said reaction product being substantially dried and containing in solution a waxy substance.

6. A sound record composition containing the reaction product of approximately 100 parts of molten lauric acid, approximately 28 parts of lead monoxide, and approximately 18 parts of a 25% solution of sodium aluminate, said reaction product being substantially dried and containing in solution a waxy substance.

7. A sound record composition containing as a base the reaction product of lauric acid and sodium aluminate mixed approximately in their chemical equivalents, the reaction product being dried and containing in solution a waxy substance.

8. A sound record composition containing as a base the reaction product of lauric acid, an alkali metal aluminate and lead monoxide, the metal aluminate and lead monoxide added together being the chemical equivalent of the lauric acid, and the ratio of the percentage of aluminate to lead monoxide being substantially one.

JACOB DOLID.